(12) United States Patent (10) Patent No.: US 8,239,854 B2
Sonkin et al. (45) Date of Patent: Aug. 7, 2012

(54) BOOKMARK AND CONFIGURATION FILE FOR INSTALLATION SEQUENCE

(75) Inventors: Dmitry Sonkin, Redmond, WA (US); Unmesh Vartak, Redmond, WA (US); Marc Greisen, Snohomish, WA (US)

(73) Assignee: Microsoft Corporation, Redmond, WA (US)

( * ) Notice: Subject to any disclaimer, the term of this patent is extended or adjusted under 35 U.S.C. 154(b) by 1441 days.

(21) Appl. No.: 11/728,374

(22) Filed: Mar. 26, 2007

(65) Prior Publication Data

US 2008/0244564 A1 Oct. 2, 2008

(51) Int. Cl.
*G06F 9/45* (2006.01)
(52) U.S. Cl. ........................................... 717/175
(58) Field of Classification Search .................... 717/175
See application file for complete search history.

(56) References Cited

U.S. PATENT DOCUMENTS

| | | | |
|---|---|---|---|
| 5,805,897 A | 9/1998 | Glowny | |
| 6,330,669 B1 * | 12/2001 | McKeeth | 713/1 |
| 6,347,397 B1 | 2/2002 | Curtis | |
| 6,438,749 B1 | 8/2002 | Chamberlain | |
| 6,604,237 B1 | 8/2003 | Giammaria | |
| 6,698,013 B1 | 2/2004 | Bertero et al. | |
| 6,698,018 B1 | 2/2004 | Zimniewicz et al. | |
| 6,715,144 B2 | 3/2004 | Daynes et al. | |
| 6,727,927 B1 * | 4/2004 | Dempski et al. | 715/853 |
| 6,778,651 B1 * | 8/2004 | Jost et al. | 379/201.01 |
| 6,880,086 B2 * | 4/2005 | Kidder et al. | 713/191 |
| 6,986,034 B2 | 1/2006 | Tyner et al. | |
| 7,017,155 B2 | 3/2006 | Peev et al. | |
| 7,080,279 B2 | 7/2006 | Asare et al. | |
| 2004/0015955 A1 | 1/2004 | Bourke-Dunphy et al. | |
| 2005/0125788 A1 | 6/2005 | Lupini et al. | |
| 2005/0229174 A1 | 10/2005 | Westendorf et al. | |
| 2006/0112311 A1 | 5/2006 | Cobb | |

FOREIGN PATENT DOCUMENTS

EP 1072973 A2 1/2001

OTHER PUBLICATIONS

Venkatakrishnan, et al., "An Approach for Secure Software Installation", Date: Nov. 3-8, 2002, http://seclab.cs.sunysb.edu/venkat/papers/lisa02.pdf.
Wang, et al., "Persistent-state Checkpoint Comparison for Troubleshooting Configuration Failures", Date: 2003, http://ieeexplore.ieee.org/iel5/8589/27228/01209941.pdf?isnumber=&arnumber=1209941.
"European Search Report", Mailed Date: Oct. 29, 2010, Application No. EP/08/73/0746, Filed Date: Oct. 10, 2010, pp. 9.
"China Notice on the First Office Action", Mailed Date: May 5, 2011, Application/Patent No: 200880010125.5, pp. 9.

* cited by examiner

*Primary Examiner* — John Chavis
(74) *Attorney, Agent, or Firm* — Russell S. Krajec; Krajec Patent Offices, LLC

(57) ABSTRACT

A bookmark file is stored in persistent storage and is updated as various tasks are completed during an installation process. The bookmark file may be read when an installation process is started so that the installation process may continue from a point after the last successfully completed task, if the installation process had failed and was restarted. The bookmark file may also include data collected from a user interface during the installation process. When an installation process is restarted, some embodiments may present the data in a user interface for the user to modify. The installation process may be defined in a configuration file that includes metadata that defines the sequence of installation tasks as well as some error handling for various tasks.

20 Claims, 3 Drawing Sheets

BOOKMARK AND CONFIGURATION FILE FOR INSTALLATION SEQUENCE

BACKGROUND

Setup and installation of operating systems and other complex computer applications may be complex and sometimes time consuming. In some cases, a computer system may halt when a problem is encountered during a setup or installation process, especially during installation of an operating system because the installation is at a low level where error trapping and recovery functions may not be available.

As operating system and complex computer applications become ever more complex, the time to install can become quite lengthy. If an error causes a problem during installation, a user may become frustrated if the installation is restarted from the beginning.

SUMMARY

A bookmark file is stored in persistent storage and is updated as various tasks are completed during an installation process. The bookmark file may be read when an installation process is started so that the installation process may continue from a point after the last successfully completed task, if the installation process had failed and was restarted. The bookmark file may also include data collected from a user interface during the installation process. When an installation process is restarted, some embodiments may present the data in a user interface for the user to modify. The installation process may be defined in a configuration file that includes metadata that defines the sequence of installation tasks as well as some error handling for various tasks.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
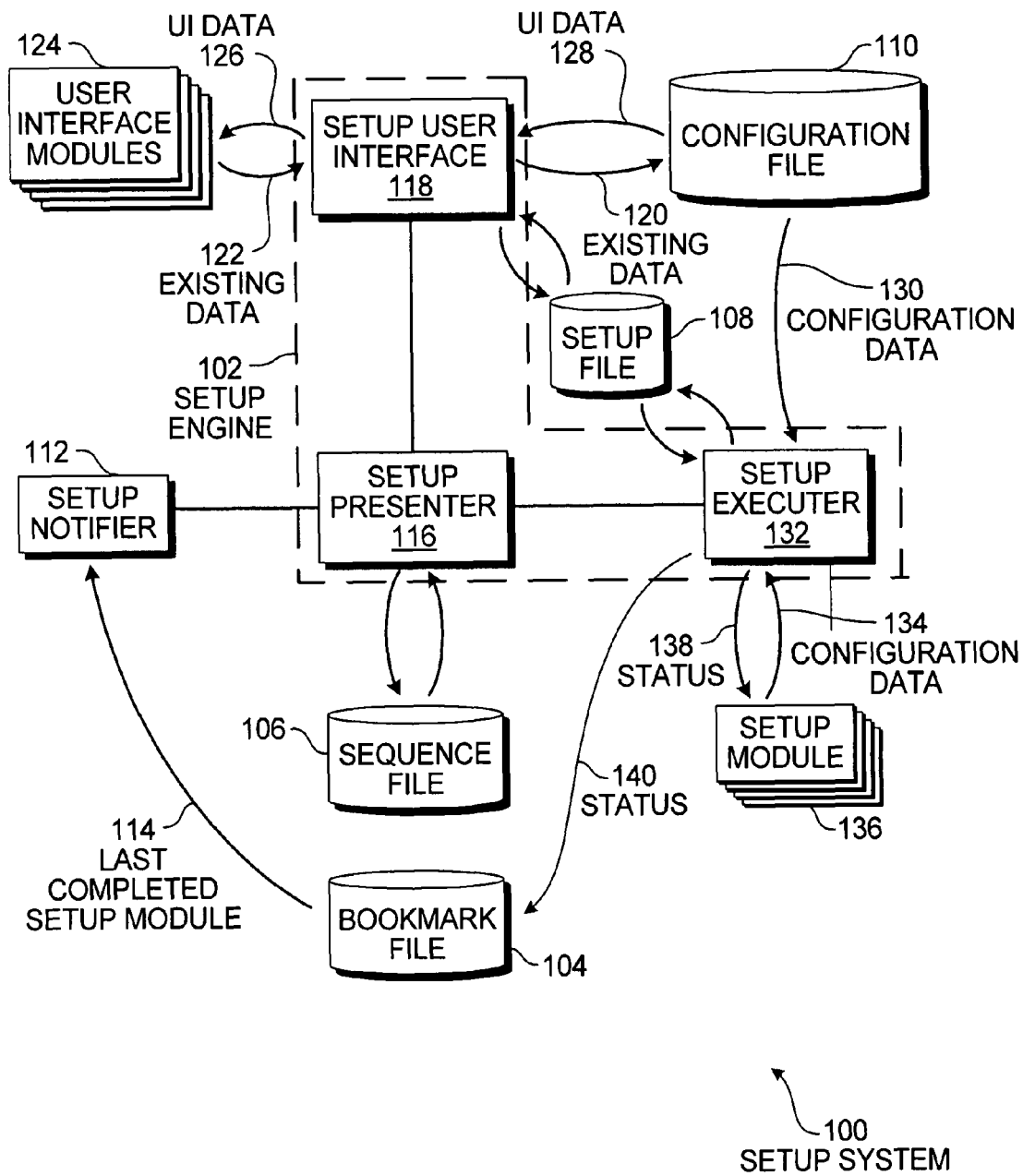
FIG. 1 is a diagram of an embodiment showing a setup system.

A bookmark file is updated throughout a setup or installation routine so that the routine may be restarted at the last successfully completed step of the routine. The bookmark file or configuration file may include data that a user may have entered during the routine and may be used to allow a user to update or change the data when restarting a setup routine after a failure.

The bookmark file allows a setup routine to rollback to a last known good configuration state and to restart installation or setup so that previous steps do not have to be repeated. This may save a substantial amount of time in complex installation processes when a failure occurs.

In some instances, a configuration file may be used to define the installation sequence using metadata. The specific tasks to be performed as well as the specific sequence and any error handling that may be applied to a specific task.

For the purposes of this specification, the terms "installation" and "setup" are used synonymously to refer to a process of putting a program, operating system, application, or other software component on a system so that the software may be used. The terms may also include configuring a hardware device or any other preparatory actions used to prepare a device for use. In some instances, the installation process may be installing data files that are not executed, while in other instances, the process may include installing executable or interpretable software functions or programs.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a setup system. A setup engine 102 uses a bookmark file 104, a sequence file 106, a setup file 108, and a configuration file 110 to perform a setup routine.

The setup engine 102 may be designed so that the actions performed by the setup engine 102 are defined in the various files. By defining some or all of the actions of the setup engine 102 in editable files, the actions may be changed, enhanced, expanded, and extended by changing the various files. In many cases, the actions of the setup engine 102 may be extendable by third parties.

The various files, such as the bookmark file 104, sequence file 106, setup file 108, and configuration file 110 may be separate, individual files or may be combined into one or more files. In some instances, the sequence file 106, setup file 108, and configuration file 110 may be a single file having three sections, or other combinations of sequence file 106 and setup file 108, or setup file 108 and configuration file 110 may be possible.

The bookmark file 104 may be used to store each step of a setup sequence so that if the setup sequence is restarted for some reason, the setup sequence may be restarted after the last successfully completed task or step.

The sequence file 106 may define the specific steps and sequence of steps used to perform an installation or setup procedure. In some instances, a single step may include large portions of a device installation, such as installing an entire software application or configuring a hardware component. In such an instance, a sequence of steps may have a handful of steps. In other instances, a single step may be a small process that is used in conjunction with many other steps to install or configure a software or hardware component. In such an instance, a sequence of steps may have hundreds or thousands of steps for an installation process. The breadth or functions performed by each step in an installation process may vary widely from one embodiment to another and from one step to another within an embodiment.

The setup file 108 may relate specific steps within an installation process to specific user interface modules 124 and specific setup modules 136. Each user interface module 124 may be a user interface definition or other portion of an information display and data capture function that is used by one or more steps. Each user interface module 124 may be a definition of a user interface that may be used for one or more steps within a setup sequence. In some implementations, two or more user interface modules 136 may be assigned to a single setup task.

The user interface modules 124 may be any type of definition of a user interface. For example, in some embodiments, a user interface module 124 may be a standalone executable file that presents and collects data to a user. In other embodiments, a user interface module 124 may be a user interface defined in a markup language, such as HTML that defines a user interface.

The setup modules 136 may be any type of executable, interpreted, or other file or function that performs an installation step. In some instances, a user interface module 124 may be paired with a setup module 136 to perform a specific task or step. The setup modules 136 may be standalone executable images or files that are directly executed by a system processor. In other embodiments, the setup modules 136 may be interpreted files, functions within a dynamically loaded library, or any other architecture. In some cases, the setup modules 136 may be separate callable functions within a larger file, executable, or other architecture.

Each setup module 136 may be configured to be performed by receiving a data input. A data input may be useful in embodiments where an installation process is to be performed without a user interface, such as when duplicate installations are performed over several devices or when an installation is to be performed and any user input is specifically not desired.

Data gathered from the user interface modules 124 may be stored in the configuration file 110, which may be transferred to the setup modules 136. The configuration file 110 may contain the data used by all of the setup modules 136 to perform the tasks of a setup process or installation. In many instances, the configuration file 110 may serve as a record of the precise configuration of a device.

The setup engine 102 may be operated on a device for the purposes of configuring the device for future operations. In such an instance, the setup engine 102 may perform tasks such as installing an operating system, applications, software components, configuring hardware settings, or any other setup operation. In other instances, the setup engine 102 may be operated on a first device for the purposes of configuring a second device. The second device may be connected over a network connection, a bus, or other communications medium. In some cases, the setup engine 102 may perform a setup operation on a storage medium such as a disk drive or memory device that may later be inserted into a second device and operated by the second device.

The user interface modules 124 and setup modules 136 may be defined in several separate modules so that the sequence and configuration of setup steps may be changed easily and quickly. In order to add another step to an installation sequence, for example, a user interface module 124 and setup module 136 may be added to the group of user interface modules and referenced in the setup file 108 and sequence file 106.

During execution of one of the setup modules 136, if an error condition exists or for some other reason, the setup module may be paused and the setup engine 102 may invoke one of the user interface modules 124 to perform an interactive function. In some instances, an interactive function may be used to gather some information from a user, prompt the user to perform a manual task, or for capturing and handling error conditions.

A setup notifier 112 may be a software or hardware component that reads the bookmark file 104 to determine a last completed setup module 114. If the last completed setup module 114 is not the last setup module in an installation sequence, the setup notifier 112 may start the setup engine 102. In some cases, the setup notifier 112 may be a daemon or other application that is loaded during a bootstrap operation for a computing device.

The setup notifier 112 is a mechanism by which a startup routine or installation sequence may be restarted. In some instances, a change to a setting or installation of a particular software component may need a device to be restarted in order to have the software component load properly. After an event is logged in the bookmark file 104, the setup notifier 112 may detect that the system was restarted after the component was installed and then cause the setup engine 102 to start operation.

The setup notifier 112 may also serve to restart an installation process after a power failure, cold reboot, or other abnormal termination of a system function. In many cases, the setup notifier 112 may be able to detect that a setup module 136 had been started but not completed. In such cases, various error trapping and recovery processes may be executed.

The setup engine 102 comprises a setup presenter 116 that may read the sequence file 106 and cause the various steps in an installation sequence to be performed. The setup presenter 116 may manage the installation steps by determining which steps are to be performed in which order, including determining if two or more steps may be performed in parallel or if two steps may be performed in sequence when dependencies exist between the steps. The setup presenter 116 may cause a setup user interface 118 to perform various user interface modules 124 to collect data, meanwhile, the setup presenter 116 may cause a setup executor 132 to start various setup modules 136.

In some embodiments, the setup presenter 116 may function as an overall sequencer and scheduler for individual steps of an installation sequence. The setup presenter 116 may be configured to perform each step serially or several steps in parallel. In some cases, the setup presenter 116 may perform a user interface query for a step, execute the step, then perform a user interface query for a second step, and so forth. In such a case, a user may interact with the system during several stages of an installation sequence and thus be more involved.

In other cases, two or more user interface queries may be performed before corresponding setup modules 136 are started. In an example of such a case, the setup presenter 116 may cause all of the user interface modules 124 to be performed before the setup modules 136 are executed. Such an example may enable a user to enter the appropriate information quickly without having to wait for various steps of an installation process to proceed.

The sequence file 106 may contain dependencies defined between specific sequence steps. When such dependencies exist, the setup presenter 116 may cause the execution of a second step to wait until a first step has been completed. In other cases, dependencies between modules or steps may be implied by defining a sequence of steps to be performed. Other definitions of setup steps may include express or implied definitions of two or more steps that may be performed in parallel.

The sequence file 106 may contain error recovery routines or sequences that may be performed when an error is detected. An error recovery routine may be a general purpose error recovery routine that is executed any time an error is recognized, or an error recovery routine may be performed when a specific error is returned or during the execution of a specific setup module 136.

The setup user interface 110 may query the configuration file 110 to return existing data 120 and transfer the existing data 122 to a user interface module 124. A particular user interface module 124 may display a portion of the existing data 122 in the user interface. In some instances, a user may be able to select, edit, or change the existing data 122 or may be prompted to overwrite or enter other data. After a user is finished editing or changing data in the user interface modules 124, user interface data 126 is transferred to the setup user interface 118 and the user interface data 128 is transferred to the configuration file 110 for storage.

When the setup presenter 116 causes the setup user interface 118 to execute a step, the setup user interface 118 may refer to the setup file 108 to determine the appropriate user interface module 124 to display for the step. The setup file 108 may contain a cross reference of user interface modules 124 and setup modules 136 to a setup step.

The setup file 108 may be modified for particular implementations of a setup routine. For example, a setup sequence may be defined for a particular application and stored in the sequence file 106. However, in order to deploy the setup sequence in a different country with a different language, the setup file 108 may be modified to refer to user interface modules 124 that are supplied in the second language. Similarly, the setup file 108 may be modified to refer to different setup modules 136 when an installation process is ported to a different type of device for which different setup modules 136 are supplied to operate on the different device.

When the setup executor 132 calls one of the setup modules 136, configuration data 130 is read from the configuration file 110 for the module and the configuration data 134 is transferred to the setup module 136. The setup module 136 may return status 138 to the setup executor 132 periodically, when an error occurs, when probed by the setup executor 132, or when the setup module 136 has completed its task.

The setup executor 132 may send a status 140 message or log that is stored in the bookmark file 104 which is in a persistent storage medium. In some embodiments, the setup executor 132 may store a message or log when a setup module 136 is started, when a status is returned from a setup module 136, when an error occurs, when a setup module has successfully completed its task, or any other significant time.

The bookmark file 104 may be stored in a persistent storage, such as a hard drive, flash memory device, or other nonvolatile memory that can be read by the setup notifier 112. When executed during a startup or bootstrap routine of a system, the setup notifier 112 may recognize that a setup module 136 was terminated abruptly or with an error call and transfer that information to the setup presenter 116. The setup presenter 116 may determine from the sequence file 106 that a particular error recovery sequence is to be performed.

In some instances, an error recovery sequence may include executing a special user interface module 124 and setup module 136 that are designed to handle a general purpose error or tailored to a specific error. In instances where no error recovery sequence is available, the setup presenter 116 may rollback the installation sequence to the last successfully completed task or to a user interface module 124 that may affect the configuration data 130 that was transferred to the last attempted setup module 136. In some instances, the setup presenter 116 may rollback the installation sequence to two or more steps before the last attempted setup module 136 so that a user may have an opportunity to change a setting or otherwise troubleshoot or correct a problem.

Some embodiments may have separate modules or software components for each of the functions described by the setup presenter 116, the setup user interface 118, and the setup executor 132. In other embodiments, two or three of the functions described by the setup presenter 116, the setup user interface 118, and the setup executor 132 may be combined into one or more software components.

Figure 2:
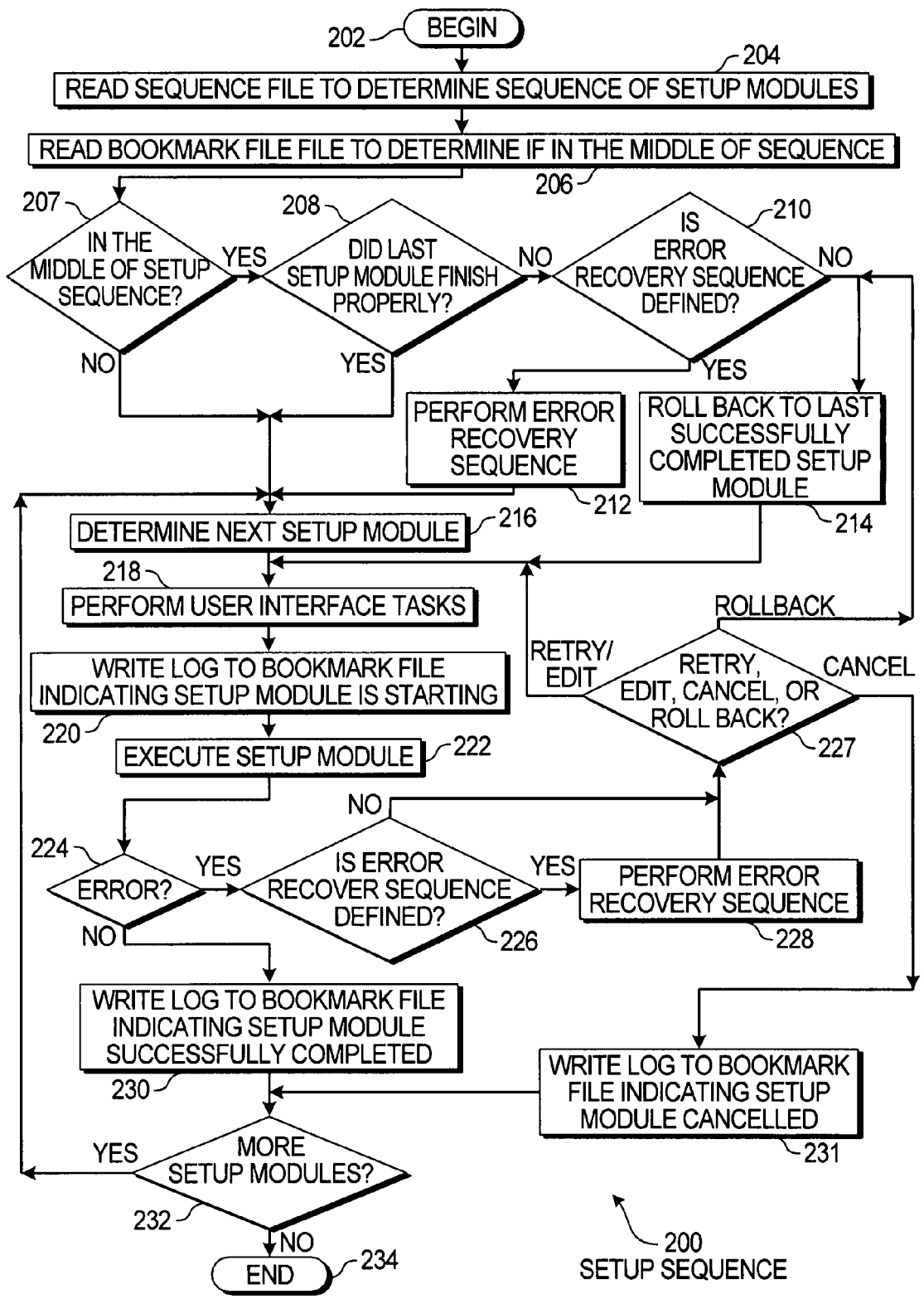
FIG. 2 is a flowchart illustration of an embodiment showing a setup sequence.

FIG. 2 is a flowchart illustration of an embodiment 200 showing a setup sequence. Embodiment 200 illustrates a method of performing several setup modules as defined in a sequence file, with logging to a bookmark file before and after each setup module is executed. Additionally, embodiment 200 shows mechanisms for restarting a setup sequence based on the bookmark file as well as some error recovery mechanisms.

The process begins in block 202. The sequence file is read to determine a sequence of setup modules in block 204, and the bookmark file is read to determine if the current state is in the middle of the sequence in block 206.

If the starting point of the process is not in the middle of a sequence in block 207, the process continues with the next setup module in block 216, which would be the first setup module.

If the starting point of the process is in the middle of a sequence in block 207 and the last setup module finished properly in block 208, the process continues with the next setup module in block 216. These conditions may occur, for example, if a setup sequence included a restart of the device on which the setup sequence 200 is operating, as is common in installation of operating systems and applications that affect networking or other operating system components.

If the last setup module did not finish properly in block 208, an error or some abnormality may have occurred. In some cases, a power failure may have caused the executing setup module to be halted before successful completion. In other cases, a user's input for the setup module may have been improper causing the executing setup module to become unstable or otherwise halt.

If an error recovery sequence is defined in block 210, the error recovery sequence is performed in block 212. An error recovery sequence may be defined for specific error states or for specific errors that occur in specific setup modules. In some embodiments, an error recovery sequence may be defined for any error that occurs in a sequence. An error recovery sequence may include a specific user interface module and may also include a specific setup module that may be executed in response to an error.

If no error recovery sequence is defined in block 210, the sequence is rolled back to the last successfully completed setup module in block 212. The rollback may be to the user interface step for a setup module that was the last successfully executed setup module. In some embodiments, the sequence may be rolled back to the user interface module for the last attempted setup module, while in other embodiments, the sequence may be rolled back to a user interface module for a setup module on the failed setup module was dependent. Each embodiment may have different rollback mechanisms and sequences.

In some cases, a bookmark file may be examined to determine that a setup module has failed repeatedly. In such cases, an embodiment may rollback an additional step in the setup sequence for each failure of the setup module. As each step is rolled back, a previously completed user interface module may be shown so that a user may change a setting, attempt a different value, or otherwise troubleshoot the failure.

The next setup module is determined in block 216. The next setup module may be the next setup module in the sequence read in block 204. In some instances, setup modules may be performed in parallel with the setup sequence 200. For example, a setup module may be started and may be executing while the setup sequence is performing various steps. In some instances, a next setup module may be dependent on the successful completion of a previous module or require a data value or other output from a setup module before the next setup module is performed. In such a case, the setup sequence 200 may pause at step 216 until the previous setup module has successfully completed.

The user interface tasks are performed in block 218. The user interface tasks are later defined in FIG. 3, and include providing a user display and interaction to determine data that may be sent to the setup modules.

A log entry is made to the bookmark file in block 220 indicating that the setup module is starting. The setup module is executed in block 222.

If an error occurs in the setup module in block 224, and an error recovery sequence is defined in block 226, the error recovery sequence is performed in block 228. The error recovery sequence in block 228 may be any type of error recovery sequence, such as those discussed above for block 212. In many cases, a specific error recovery sequence may be defined for a specific error.

If no error recovery sequence is defined in block 226 or the error recovery sequence has been completed in block 228, a user may be given an opportunity in block 227 to select between retrying the setup module, editing the data from the user interface, rolling back to a previous setup module, or cancelling the setup module. Other embodiments may have some or all of the above options available for a user, while still other embodiments may have additional options. The options illustrated in embodiment 200 are merely illustrative of possible options that may be implemented in different embodiments and are not meant to be exhaustive.

The options in block 227 may reflect different ways in which an error may be handled when the error is detected and captured in block 224. One mechanism is to allow a user to edit values sent to the setup module and retry the setup module. Such an option may cause the process to continue with block 218. In another option, a user may be able to rollback to a previous setup module in block 214, and may be permitted to rollback several steps in some embodiments. The user may choose to perform a rollback in block 214 if the user wishes to change a value of a parameter, for example, that was entered in a previous step. By rolling back to a previous step, the user may be able to re-execute some previous setup modules using different values.

Another option that a user may choose in block 227 is to cancel the current setup module. The cancel option may cause the currently executing setup module to be halted, if the setup module is not already halted, and a log is written to the bookmark file in block 231 that indicates the setup module has been cancelled. In some embodiments, subsequent setup modules may be performed if the subsequent setup modules are not dependent on the cancelled setup modules.

If no errors occur in block 224, a log may be written to the bookmark file in block 230 indicating that the setup module has successfully completed. If more setup modules remain to be executed in block 232, the process continues in block 216 where the current setup module is incremented and begun. Otherwise, the process ends in block 234.

Embodiment 200 illustrates one simple mechanism for performing a user interface step and executing a setup module with some error detection and recovery options. In many instances, a sequence file may include more complex conditions and error handling routines for different situations. For example, when a specific error is detected, a user-supplied value that potentially caused the error condition may be presented to the user for a new value and the setup module is restarted. If the same error is detected twice, the sequence may be rolled back to a different point and a different user-supplied value may be highlighted for editing. Such logic and sequence branching may be defined in a sequence file or in an error recovery routine in blocks 212 or 228.

Figure 3:
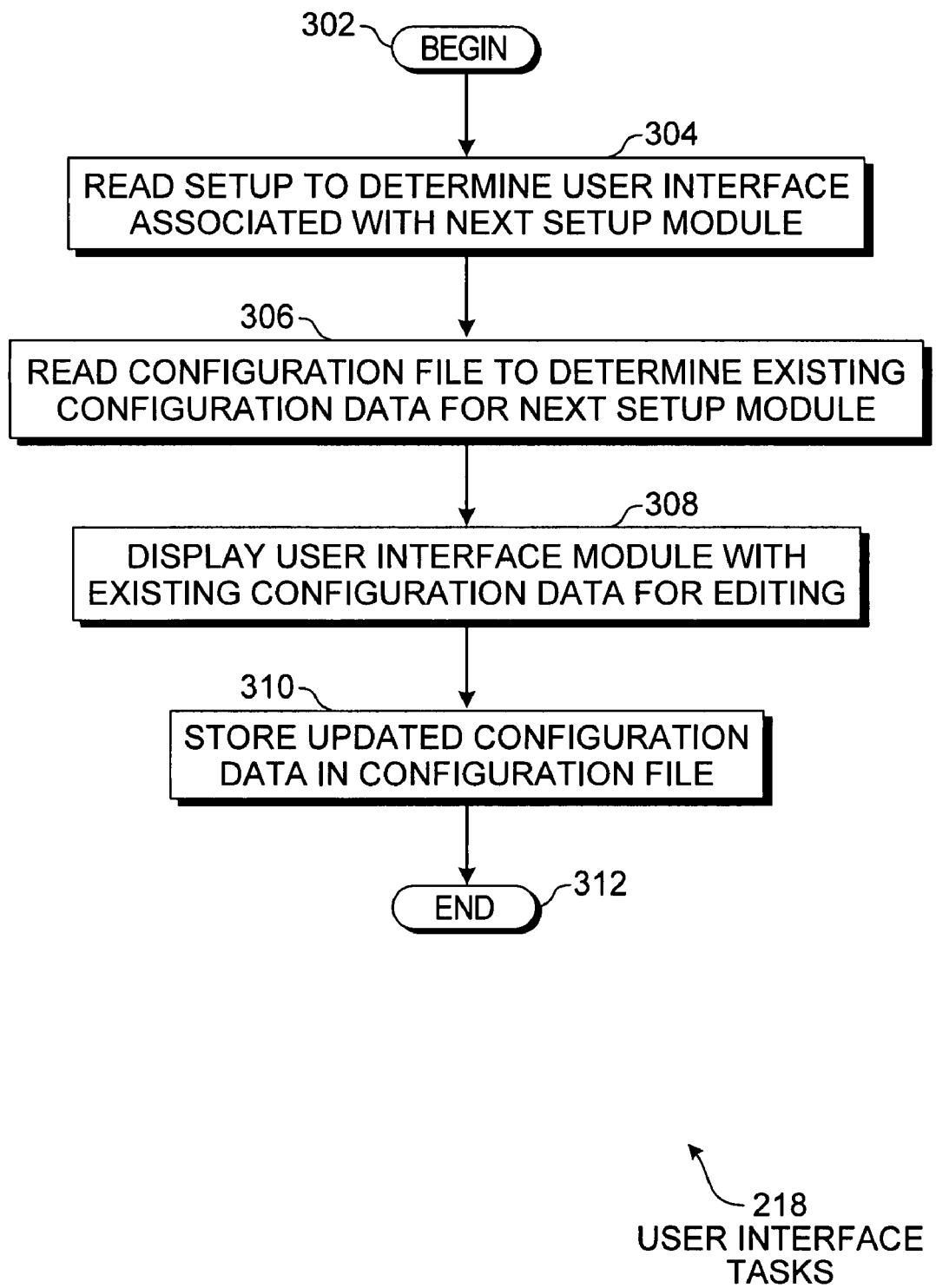
FIG. 3 is a flowchart illustration of an embodiment showing a sequence of user interface tasks.

FIG. 3 is a flowchart illustration of an embodiment of the user interface tasks 218 presented in FIG. 2.

The user interface tasks begin in block 302. The setup file is read in block 304 to determine a user interface module associated with a next setup module. The configuration file is read in block 306 to determine existing configuration data for the next setup module.

The user interface module is displayed in block 308 with at least some of the existing configuration data for editing. Once the editing is completed, the updated data are stored in the configuration file in block 310 and the process ends in block 312.

The user interface module may be any type of user interface that enables a user to read, edit, change, enter, select, or otherwise determine data to be used for a setup module. In some instances, the user interface module may perform some data analysis, modification, translation, or conversion to change user interface input into data that may be acceptable to a setup module.

The user interface modules may be a segment of a user interface definition that is designated for a specific setup module. The user interface module may be any architecture or mechanism for a user interface. In some embodiments, separate user interface module may be created for each setup module in a markup language such as HTML and displayed through a browser or other display capable of displaying HTML. In other embodiments, a user interface module may include a wizard or other multiple screen, progressive user interface mechanism through which a user may be prompted to answer various questions or enter data.

In other embodiments, a user interface module may be a standalone executable program that performs specific user interface and data capture tasks. In a version of such an embodiment, several user interface modules may be contained in a single executable program that may execute a portion of the user interface tasks that are designated for a specific user interface module. The mechanisms and implementation details for a user interface may vary considerably for the type of device, the physical characteristics of the device, and the available hardware and software components available to perform user interface functions.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A system comprising:
a computer hardware system;
a plurality of setup modules operating on said computer hardware system;
a configuration file comprising configuration data used by at least one of said plurality of setup modules;
a sequence file comprising a definition of a sequence of said setup modules to be executed;
a bookmark file in a persistent storage, said bookmark file adapted to store a last completed setup module; and
a setup engine adapted to:
determine a next setup module from said sequence file and said bookmark file;
store a first entry in said bookmark file before starting said next setup module;
cause said next setup module to be executed;
detect that said next setup module has successfully completed execution; and
store a second entry in said bookmark file after said next setup module has successfully completed execution.

2. The system of claim 1 further comprising:
a plurality of user interface modules; and
a setup file comprising relationship definitions for at least one relationship between at least one of said plurality of setup modules and at least one of said plurality of user interface modules.

3. The system of claim 2, said setup engine further adapted to:
determine a related user interface module for said next setup module; and
display said related user interface module.

4. The system of claim 1, said setup modules comprising at least one from a group composed of executable files and interpreted files.

5. The system of claim 1, said sequence file further defining a dependency between a first setup module and a second setup module.

6. The system of claim 1, said sequence file further defining at least two of said setup modules that may be executed in parallel.

7. The system of claim 1, said sequence file further defining at least one error handling sequence for one of said setup modules.

8. The system of claim 7, said setup engine further adapted to:
determine that an error has occurred during execution of said next setup module; and
performing said error handling sequence.

9. The system of claim 1 further comprising a single file comprising at least one combination from a group composed of:
said configuration file and said sequence file;
said configuration file and said bookmark file;
said sequence file and said bookmark file; and
said configuration file, said sequence file, and said bookmark file.

10. The system of claim 1 further comprising:
a setup notifier adapted to detect a last of set setup modules to have been successfully completed, said setup notifier being adapted to be executed when said system is started.

11. The system of claim 1, said sequence of setup modules defining an installation process for a software component on said system.

12. The system of claim 1, said sequence of setup modules defining an installation process for a software component on a second system.

13. A method comprising:
reading a sequence file comprising a sequence of setup modules to be executed;
reading a bookmark file comprising a last completed setup module;
determining a next setup module from said sequence file and said bookmark file;

storing a first entry in said bookmark file before starting said next setup module;

causing said next setup module to be executed;

detecting that said next setup module has successfully completed execution; and storing a second entry in said bookmark file after said next setup module has successfully completed execution.

14. The method of claim 13 further comprising:

detecting that an error has occurred during execution of said next setup module; and performing an error handling sequence defined in said sequence file.

15. The method of claim 14 wherein said detecting than an error has occurred is performed when a system is started.

16. A computer readable storage medium comprising computer executable instructions adapted to perform the method of claim 13.

17. A method comprising:

detecting that a last attempted setup module was started but not completed, said detecting being performed by reading a bookmark file;

reading a sequence file comprising a definition of a plurality of setup modules to be executed;

reading a configuration file comprising configuration data used by at least one of said plurality of setup modules, said configuration data comprising last attempted module data;

reading a setup file comprising relationship definitions between at least one of said setup modules and at least one user interface module;

determining a related user interface module for said last attempted setup module; and displaying said related user interface module with at least a portion of said last attempted module data.

18. The method of claim 17 further comprising:

determining an error handling sequence for said last attempted setup module, said error handling sequence being determined from said sequence file; and performing said error handling sequence.

19. The method of claim 17, said detecting that a last attempted setup module being performed when a system is restarted.

20. A computer readable storage medium comprising computer executable instructions adapted to perform the method of claim 17.

* * * * *